(12) United States Patent
Wild et al.

(10) Patent No.: US 7,540,148 B2
(45) Date of Patent: Jun. 2, 2009

(54) METHOD AND DEVICE FOR OPERATING AT LEAST ONE TURBOCHARGER ON AN INTERNAL COMBUSTION ENGINE

(75) Inventors: Ernst Wild, Oberriexingen (DE); Sabine Wegener, Asperg (DE); Rainer Hild, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 213 days.

(21) Appl. No.: 10/489,926

(22) PCT Filed: Jul. 20, 2002

(86) PCT No.: PCT/DE02/02683

§ 371 (c)(1),
(2), (4) Date: Sep. 20, 2004

(87) PCT Pub. No.: WO03/027464

PCT Pub. Date: Apr. 3, 2003

(65) Prior Publication Data
US 2005/0056012 A1 Mar. 17, 2005

(30) Foreign Application Priority Data
Sep. 13, 2001 (DE) .................................. 101 45 038

(51) Int. Cl.
*F02B 33/44* (2006.01)
*F02B 37/12* (2006.01)
*F02B 37/13* (2006.01)
*F02B 37/18* (2006.01)
*F02D 23/00* (2006.01)

(52) U.S. Cl. .................. 60/602; 60/605.1; 60/608; 60/612

(58) Field of Classification Search ............... 60/598, 60/602, 605.1, 607–609, 611, 612; 123/559.1, 123/564, 562
See application file for complete search history.

(56) References Cited

U.S. PATENT DOCUMENTS

| | | | | |
|---|---|---|---|---|
| 2,492,485 A | * | 12/1949 | King ............................. | 60/602 |
| 4,392,352 A | * | 7/1983 | Stumpp et al. ................. | 60/602 |
| 4,467,608 A | * | 8/1984 | Matushiro et al. ............. | 60/602 |
| 5,816,047 A | * | 10/1998 | Zurlo ........................... | 60/602 |
| 6,029,452 A | | 2/2000 | Halimi et al. .................. | 60/602 |
| 6,058,708 A | | 5/2000 | Heinitz ......................... | 60/602 |

(Continued)

FOREIGN PATENT DOCUMENTS

DE 197 08 721 9/1998

(Continued)

OTHER PUBLICATIONS

Automotive Handbook, Bosch 3rd ed., 1993, pp. 466-471.

(Continued)

*Primary Examiner*—Thai Ba Trieu
(74) *Attorney, Agent, or Firm*—Kenyon & Kenyon LLP

(57) ABSTRACT

A method and a device for operating at least one supercharger of an internal combustion engine is described, the actuating signal for at least one actuating element of the supercharger (waste gate actuator, electrical auxiliary compressor) being generated as a function of the exhaust gas volume flow in the exhaust tract of the internal combustion engine.

12 Claims, 4 Drawing Sheets

U.S. PATENT DOCUMENTS

| | | | | |
|---|---|---|---|---|
| 6,076,352 A | * | 6/2000 | Hayashi | 60/602 |
| 6,161,384 A | * | 12/2000 | Reinbold et al. | 60/602 |
| 6,354,078 B1 | * | 3/2002 | Karlsson et al. | 123/559.2 |
| 6,474,323 B1 | * | 11/2002 | Beck et al. | 60/599 |
| 6,662,562 B2 | * | 12/2003 | Engel et al. | 60/602 |
| 6,688,104 B2 | * | 2/2004 | Baeuerle et al. | 60/608 |
| 6,705,084 B2 | * | 3/2004 | Allen et al. | 60/608 |
| 6,732,523 B2 | * | 5/2004 | Birkner et al. | 60/611 |
| 6,751,956 B2 | * | 6/2004 | Mayer et al. | 60/602 |
| 7,174,777 B2 | * | 2/2007 | Fischer et al. | 73/114.33 |
| 2005/0097945 A1 | * | 5/2005 | Flores et al. | 73/118.1 |
| 2008/0104957 A1 | * | 5/2008 | Birkner et al. | 60/602 |

FOREIGN PATENT DOCUMENTS

| | | |
|---|---|---|
| DE | 199 35 901 | 2/2001 |
| DE | 199 36 269 | 2/2001 |
| EP | 1 070 837 | 1/2001 |
| JP | 1110832 | 4/1989 |
| JP | 2000110573 | 4/2000 |

OTHER PUBLICATIONS

Bosch, Automotive Handbook, Bosch 22$^{nd}$ edition., 1993, pp. 475-476.

* cited by examiner

METHOD AND DEVICE FOR OPERATING AT LEAST ONE TURBOCHARGER ON AN INTERNAL COMBUSTION ENGINE

FIELD OF THE INVENTION

The present invention relates to a method and a device for operating at least one supercharger of an internal combustion engine.

BACKGROUND INFORMATION

Exhaust gas turbochargers are used in some applications for increasing the power output of engines. The volume flow of exhaust gas drives a turbine connected via a shaft to a compressor which compresses the intake air. The compression ratio is a function of the volume flow of the gas passing through the turbine. The exhaust gas turbocharger in existing approaches is designed so that high compression occurs, even at low gas flow rates. So that compression ratios and turbine rotational speeds that could damage the engine or exhaust gas turbocharger do not result at high gas throughput rates, a bypass around the turbine, known as a "waste gate," is installed. A flap or valve is provided in this bypass which modifies the cross section of the bypass opening. In one known approach, the flap or valve is actuated by a linkage which is moved by an aneroid capsule. The diaphragm of the capsule is connected to the linkage. A spring in the capsule forces the diaphragm upward. The boost pressure which is supplied from the intake manifold via a hose pipe of the aneroid capsule acts against the spring force. At high boost pressures the boost pressure prevails, and the waste gate opens. This system acts as a mechanical-pneumatic regulation. Depending on the gas volume flow, specified boost pressures are established in the intake manifold. To enable the boost pressure to be varied independently from these physical factors, a timing valve is installed in the hose pipe leading to the aneroid capsule. The function of the boost pressure regulation is to actuate this timing valve in such a way that an intended boost pressure is established. As the timing ratio increases, increasingly more air is discharged from the hose pipe to the outside. As a result, the back pressure against the spring drops, the waste gate closes, and the boost pressure rises (see, for example, Bosch, Automotive Handbook, 3rd edition, pages 466–71).

It has been shown that other adjustment mechanisms for controlling the cross section of the bypass opening may also be used, such as actuation of the linkage of the flap by an electrical actuator. The pneumatic counter-coupling over the boost pressure, which makes the exhaust gas turbocharger inherently stable, is thus omitted. The pneumatic counter-coupling enlarges the cross section of the opening as the boost pressure increases, thereby preventing the turbine from overspeeding. Without pneumatic counter-coupling the exhaust gas turbocharger is co-coupling, and therefore unstable. Other adjustment mechanisms include, for example, a variable turbine geometry, a variable sliding turbine, or a valve in the waste gate which is moved by a servomotor. The counter-coupling characteristic is at least partially absent for these actuators as well. Therefore, there is a need for a boost pressure regulation which is universally applicable and which ensures the stability of the exhaust gas turbocharger.

Another consideration is that an electrical compressor is installed in series to improve the response characteristics of an exhaust gas turbocharger. This is set, for example, below a specified engine rotational speed when the driver requests acceleration (see, for example, U.S. Pat. No. 6,029,452). Boost pressure regulation should also be usable in such a system.

SUMMARY OF THE INVENTION

By controlling the supercharger system as a function of the exhaust gas volume flow, the controllability of an exhaust gas turbocharger system in terms of control engineering is ensured by electronic boost pressure regulation. Thus, the same regulating algorithm may advantageously be used for different types of actuators. This is because the counter-coupling characteristics, absent when other actuators are used on the exhaust gas turbocharger, are simulated by setting up an electrical pilot control of the actuator as a function of the exhaust gas volume flow. Thus, damage to the supercharger system by the application of boost pressure regulating parameters is also effectively prevented.

The above-mentioned advantages are also achieved when an electrical supercharger system, in particular an electrical auxiliary charger, is used in conjunction with an exhaust gas turbocharger. Here as well, the counter-coupling response is simulated by the pilot control as a function of the exhaust gas volume flow.

The start time and the duration of the electrical auxiliary compressor's operation are advantageously derived on the basis of the exhaust gas volume flow by running the auxiliary compressor only until the exhaust gas volume flow reaches the volume flow demand of the turbine. In this manner the operating time of the electrical auxiliary compressor, and thus the load on the battery, is advantageously minimized.

It is also advantageous that the auxiliary compressor is not switched on unless a setpoint boost pressure is required which exceeds the base boost pressure.

DETAILED DESCRIPTION

Figure 1:
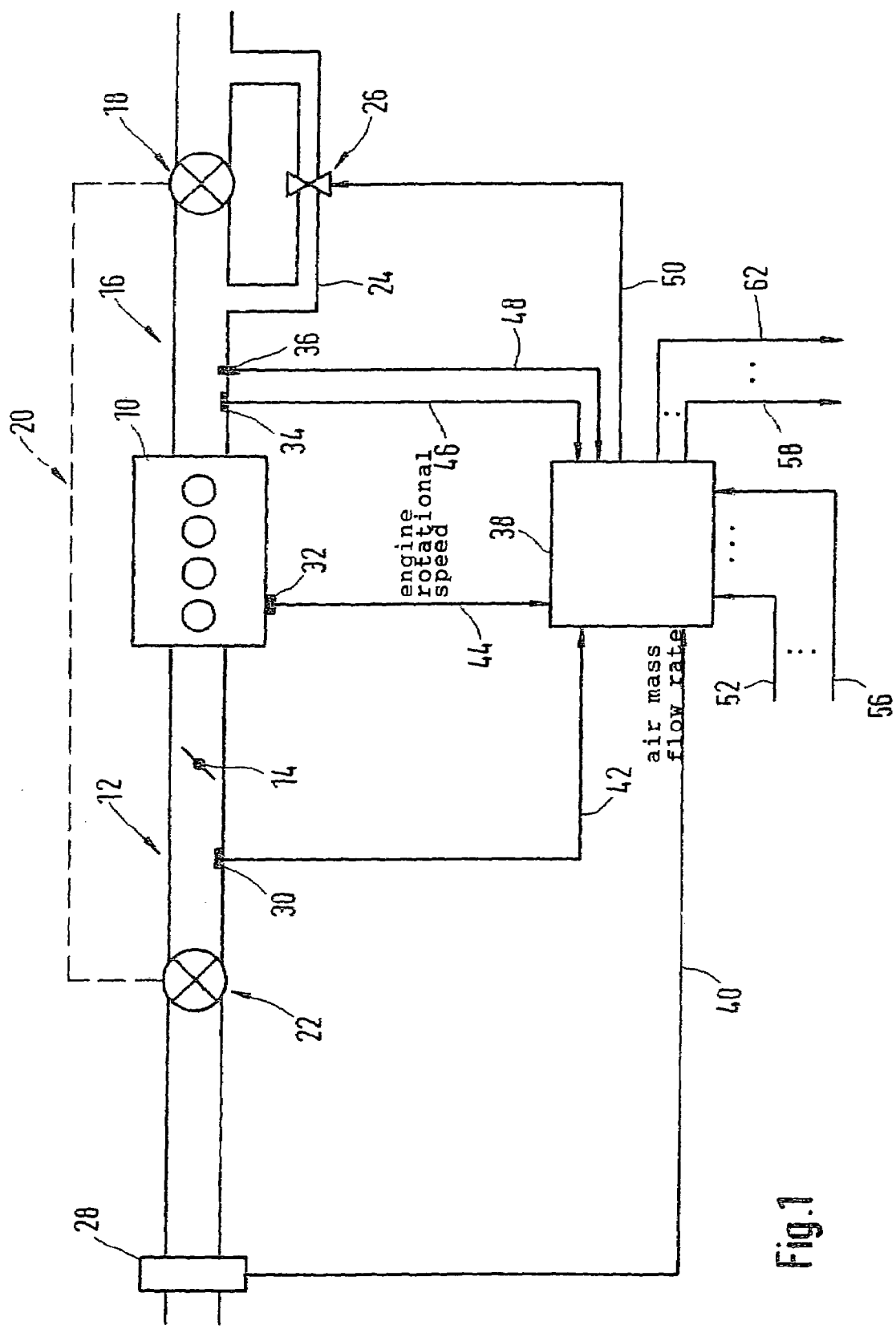
FIG. 1 shows a general diagram of an internal combustion engine having an exhaust gas turbocharger.

In the general diagram shown in FIG. 1, an internal combustion engine 10 is illustrated which includes an intake system 12 having a throttle valve 14, and an exhaust gas system 16. Turbine 18 of an exhaust gas turbocharger is situated in exhaust gas system 16, and the turbine is connected to compressor 22, which is situated at the intake manifold, via a mechanical connection 20. An electrically actuatable valve 26 is provided in a bypass duct 24 around turbine 18 of the exhaust gas turbocharger. Various sensors are installed for detecting different performance quantities in the region of the internal combustion engine. A selection of these sensors is illustrated in FIG. 1 with a view to the procedure described below: an air mass flow meter 28, an intake manifold pressure sensor 30, an engine rotational speed sensor 32, an exhaust gas pressure sensor 34, and an exhaust gas temperature sensor 36. An electronic controller 38 is also illustrated which receives lines from the above-mentioned sensors: a line 40 from air mass flow meter 28, a line 42 from intake manifold pressure sensor 30, a line 44 from rotational speed sensor 32, a line 46 from exhaust gas pressure sensor 34, and a line 48 from exhaust gas temperature sensor 36. Control unit 38 also has an output line 50 used for controlling electrically actuatable valve 26. In addition to the illustrated input and output lines, additional input and output lines are provided which are necessary for controlling the internal combustion engine. These are symbolized in FIG. 1 by lines 52 through 56 and 58 through 62, respectively, and are not described in greater detail since they are of only secondary importance in conjunction with the procedure described below for operating the charger. Input lines 52 through 56 connect control unit 38 to sensors such as lambda probes, temperature sensors, etc., while output lines 58 through 62 lead to injectors, ignition output stages, throttle valve actuators, exhaust gas recirculation valves, etc.

A procedure is described below which assists in actuating valve 26 as part of the operation of the exhaust gas turbocharger system. In the preferred exemplary embodiment, actuating element 26 is a servomotor that, at the location of the aneroid capsule and the timing valve, moves the linkage which adjusts the cross section of bypass line 24. However, the procedure described below may also be used in systems having another actuator design, such as for electrically actuatable valves, for example.

The fundamental principle of the procedure is that actuating element 26 is actuated depending on the exhaust gas volume flow, thereby creating a pilot control for the boost pressure regulation which simulates the counter-coupling characteristics. In the actual exemplary embodiment, the volume flow of the exhaust gas, at which the setpoint boost pressure is established, is calculated as a function of the engine rotational speed and the setpoint boost pressure. In the preferred exemplary embodiment this is achieved by a characteristics map, in which parameters are stored which take into account the mechanical and geometric characteristics of the turbocharger system. The exhaust gas volume flow produced by the engine is also calculated. This is performed using a model, for example, in which the exhaust gas temperature is determined as a function of air mass flow rate ml (measured by air mass flow meter 28) supplied to the internal combustion engine, and the exhaust gas volume flow is determined as a function of the exhaust gas pressure. The difference between the setpoint exhaust gas volume flow and the instantaneous exhaust gas volume flow results in the exhaust gas volume flow which should pass through the bypass to the turbine. This volume flow is modulated by the output signal from the boost pressure regulator, which is interpreted as a differential volume flow. The volume flow calculated from the difference between the setpoint and the actual volume flow, plus that calculated by the boost pressure regulator, is evaluated to determine the position of the electrical actuator. A characteristic line, for example, is provided in which the volume flow is converted to an actuating signal.

The illustrated pilot control over the exhaust gas volume flow has counter-coupling characteristics, as the result of which the exhaust gas volume flow produced by the engine is taken into account. When the setpoint volume flow is passed through the turbine, the turbine rotational speed increases, and thus the rotational speed of the compressor situated on the intake side increases as well. This causes an increase in the boost pressure and the exhaust gas volume flow. The calculation and evaluation of the exhaust gas volume flow takes this into account in the control, since the pilot control then increases the cross section of the bypass opening. The exhaust gas turbocharger thus remains stable.

The boost pressure regulator itself only performs corrections on a stable system. Thus, as a boost pressure regulator it is advantageously sufficient to use a conventional, robust, and easily usable regulator, such as a regulator having a proportional, integral, and differential response, which is also used for actuators with counter-coupling characteristics, as previously mentioned.

The pilot control itself operates in such a way that the cross section of the bypass opening is not constant as the exhaust gas volume flow increases, but instead increases even when the regulator is switched off.

The above-described procedure is implemented in the preferred exemplary embodiment as a program on a microcomputer which is part of control unit 38. The program on the microcomputer includes the necessary commands for performing the procedure.

Figure 2:
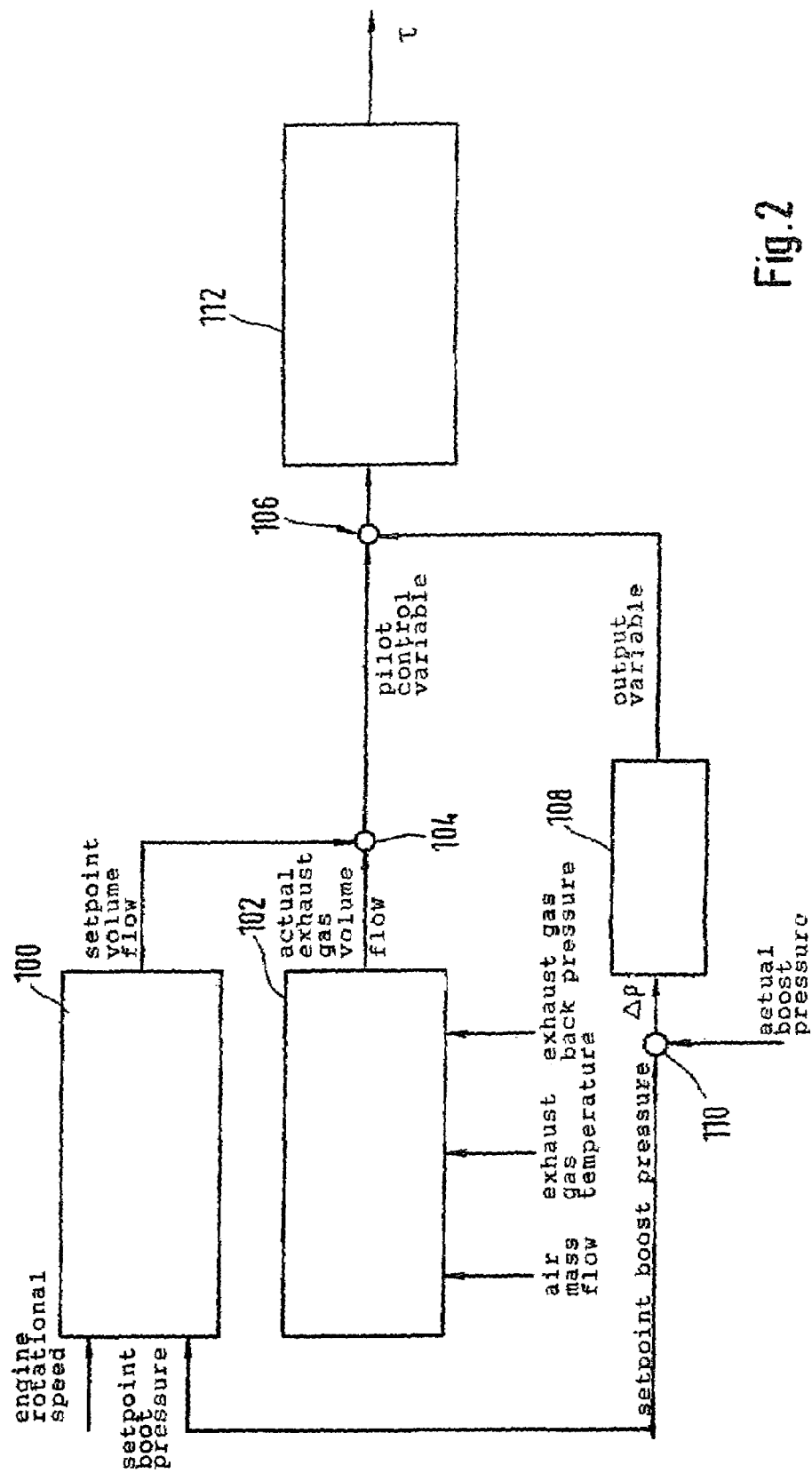
FIG. 2 shows a flow chart of a control of the internal combustion engine.

FIG. 2 shows a flow chart of such a program, the individual blocks representing programs, subprograms, or program steps, in particular commands or a summation of commands, whereas the connecting lines represent the information flow.

First, in 100 a setpoint volume flow VSTUS over the turbine is calculated as a function of engine rotational speed nmot and setpoint boost pressure plsol. In the preferred exemplary embodiment, this is carried out using a characteristics map, and in another exemplary embodiment, using calculation steps. Essentially, the setpoint volume flow will increase with increasing setpoint boost pressure and increasing rotational speed.

The setpoint boost pressure itself is determined from a setpoint pressure ratio between the pressure upstream and the pressure downstream from the compressor, which in turn depends on the engine rotational speed. Actual exhaust gas volume flow VSABG is determined in 102. In one preferred exemplary embodiment, this actual exhaust gas volume flow is calculated based on supplied air mass ml, exhaust gas temperature Tabg, and exhaust gas back pressure Pabg. The exhaust gas temperature and the supplied air mass are calculated, whereas the exhaust gas back pressure is measured, or calculated using a model. In the preferred exemplary embodiment, an equation is used for calculating the actual exhaust gas volume flow, which is approximately as given below:

$$VSABG = k \cdot ML \cdot TABG/PABG$$

where k is a constant.

The difference between setpoint volume flow VSTUS and actual exhaust gas volume flow VSABG (ΔVS=VSABG−VSTUS) is determined in node 104. Difference ΔVS is sent to an additional node 106.

In addition, a regulating algorithm 108 is provided which determines an output variable VSBYST as a function of its input variable. The input variable is a difference ΔP which is generated in node 110. In this node the setpoint boost pressure and the actual boost pressure PLIST measured by a boost pressure sensor are compared, and the resulting difference is sent to the regulator. The regulating algorithm then generates the output variable, which in node 106 corrects pilot control variable ΔVS. The correction is carried out as an addition, for example. In 112 the corrected pilot control variable ΔVS+VSBYST is converted to an actuating signal for the actuator of the exhaust gas turbocharger. In the preferred exemplary embodiment this is performed using a characteristics map, which assigns an output variable τ to the input variable.

A control variable having quantity τ as a parameter is output by the microcomputer or the control unit for actuating the valve or actuator of the charger, which sets a volume flow in the bypass of the turbine. This volume flow corresponds to the volume flow according to the pilot control plus the regulating correction.

Figure 3:
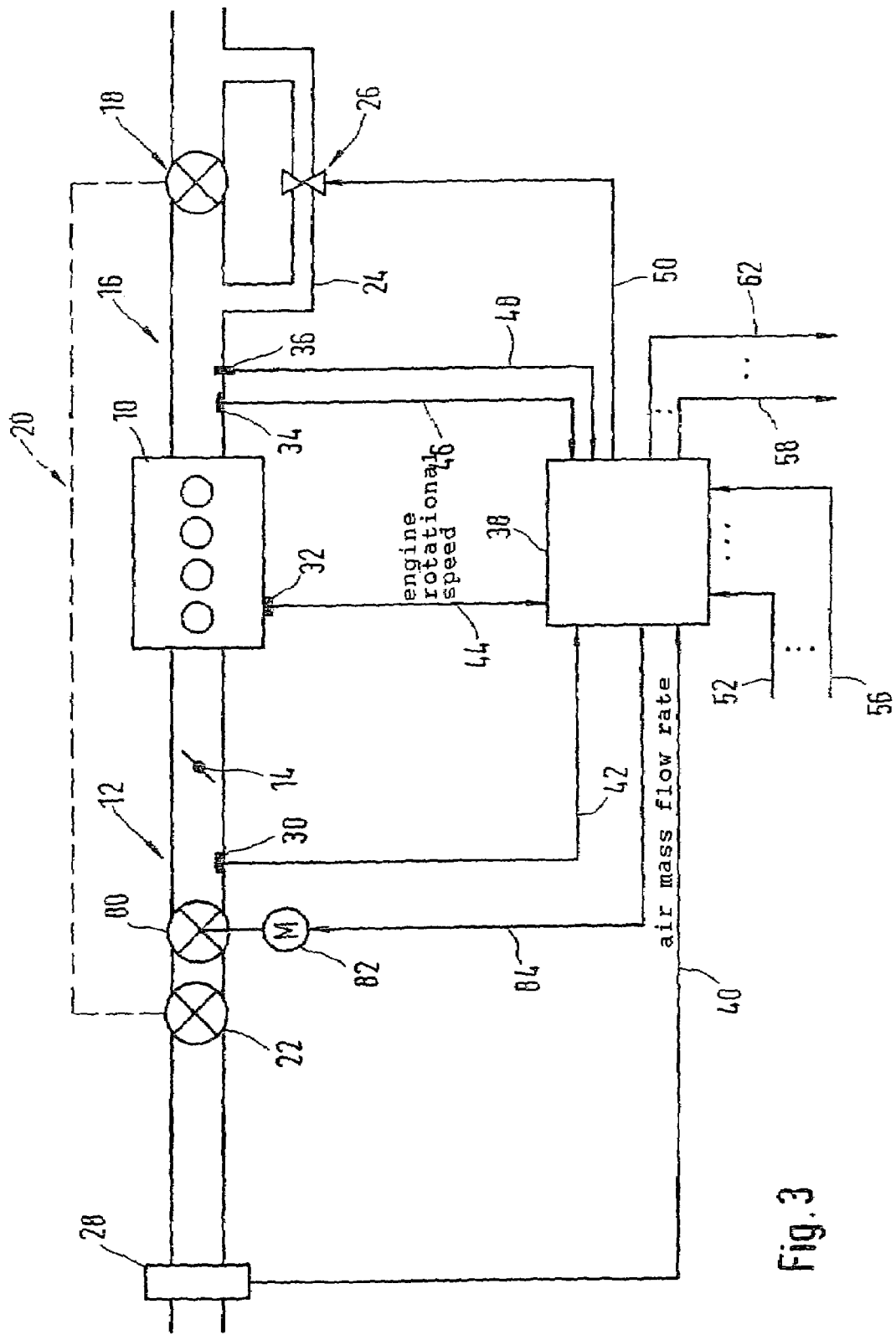
FIG. 3 shows a general diagram of an internal combustion engine having an exhaust gas turbocharger and an electrical auxiliary charger.

In a second exemplary embodiment, the above-described procedure is used in conjunction with a turbocharger system which in addition to the mechanical exhaust gas turbocharger has an electrical auxiliary charger. One such system is illustrated in the general diagram in FIG. 3. The system illustrated in FIG. 1 is supplemented by an auxiliary supercharger 80, driven by an electric motor, which is situated in the direction of flow downstream from compressor 22 and upstream from throttle valve 14 in the induction tract of internal combustion engine 10. This auxiliary supercharger is driven by an electric motor 82 which is supplied with an actuating signal by controller 38 via an output line 84. The other components and lines correspond to those illustrated in FIG. 1, and therefore are provided with the same reference numbers and have the same function.

One such electrical auxiliary supercharger is connected in series to the exhaust gas turbocharger because of the delayed response characteristic of the exhaust gas turbocharger, and is generally operated when acceleration is requested. The delayed response characteristic is thus compensated for during acceleration, and operation is optimized. The operating time of the electrical auxiliary charger, which consumes resources of the motor vehicle and in particular greatly increases the load on the battery, should be minimized. It has been shown that this minimization may be achieved when the electrical compressor is operating, if the instantaneous exhaust gas volume flow is less than the flow demand of the turbine. These variables are available from the above-mentioned pilot control. Another criterion for operating the electrical auxiliary compressor, which may be used in addition to that described above, is that a setpoint boost pressure is required which exceeds the base boost pressure. The base boost pressure is the pressure which results without special actuation of the exhaust gas turbocharger as a consequence of the air flow to the internal combustion engine.

The auxiliary compressor is operated only until the instantaneous exhaust gas volume flow reaches the flow demand of the turbine. The operating time of the auxiliary compressor, and thus the load on the battery, is thereby minimized. The reason for this is that the exhaust gas turbocharger itself has a co-coupling response. When the volume flow demand of the turbine is exceeded, the turbine rotates more rapidly, the compressor rotates with the turbine, and the boost pressure increases. The exhaust gas volume flow increases, which once again results in more rapid rotation of the turbine. As described above, with increasing boost pressure increasingly more exhaust gas must be diverted around the turbine so that the turbine does not overspeed. This is accomplished by the above-mentioned pilot control, as described above. Thus, if the volume flow demand of the turbine is met, no auxiliary compression by the electrical auxiliary compressor is necessary, since the exhaust gas turbocharger then provides sufficient boost pressure through its co-coupling response.

Thus, suitable measures which specify the operating condition for the electrical auxiliary compressor are important. This is deduced from the above-described pilot control of the exhaust gas turbocharger actuator. The exhaust gas volume flow is calculated there from the measured or modeled variables of air mass flow rate, exhaust gas temperature, and exhaust gas pressure. Likewise, the volume flow demand required for starting the exhaust gas turbocharger is determined. This is either specified as a fixed value or, as described above, is determined from the boost pressure and rotational speed. If the instantaneous exhaust gas volume flow is greater than the flow demand of the turbine, the difference between the two flows is diverted around the turbine via the waste gate. Overspeeding of the turbine is thus prevented. However, if the volume flow demand of the turbine is greater than the exhaust gas flow delivered, an operating condition for the electrical auxiliary supercharger is set. The auxiliary compressor is then switched on, and an actuating signal for electrical motor 82 is generated. In this manner the exhaust gas mass flow increases, and the turbine starts. When the exhaust gas flow exceeds the flow demand of the turbine by a certain quantity, the auxiliary compressor is switched off again. A switching hysteresis is advantageously provided here.

In a further exemplary embodiment, the auxiliary compressor is not operated until, in addition to the operating requirement deduced from the exhaust gas flow, there is a requirement for activation of the boost pressure regulation, i.e., when the setpoint boost pressure exceeds the base boost pressure.

Using the above-described procedure, the auxiliary compressor always switches off at the same exhaust gas volume flow under various operating conditions (load, rotational speed, for example). The operating time of the auxiliary compressor is optimized.

Figure 4:
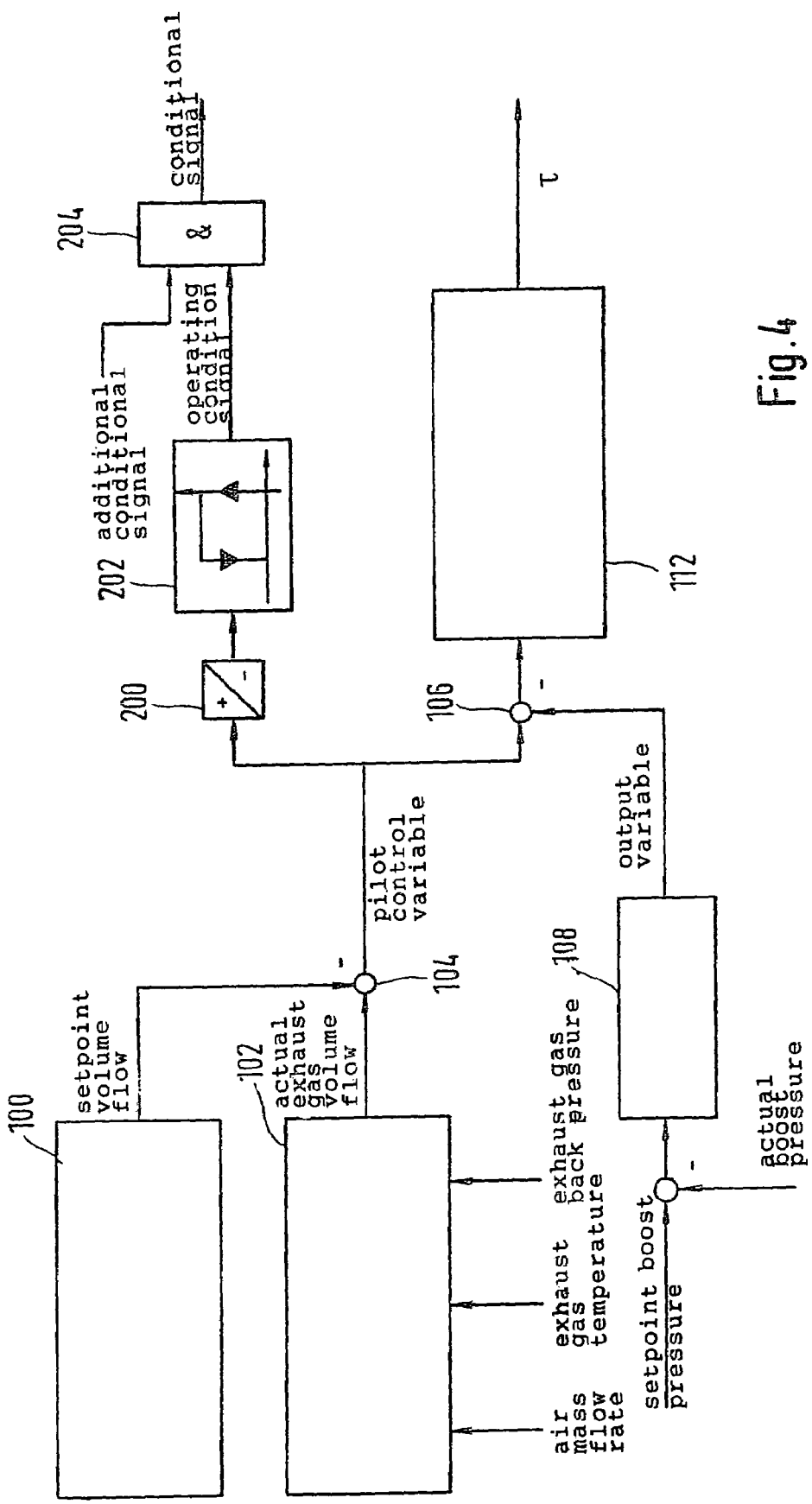
FIG. 4 shows an additional flow chart illustrating a control of the internal combustion engine.

The procedure described above is implemented here analogously to the first exemplary embodiment using a program in the microcomputer of control unit 38. A flow chart for one such program is outlined in FIG. 4. Here as well, the components already described with reference to the flow chart of FIG. 2 are provided with the same reference numbers and have the function described in FIG. 2.

Thus, in 100 the setpoint volume flow is determined which is either specified by the rotational speed and setpoint boost pressure, or is specified as a fixed value. This is compared to the exhaust gas volume flow, which is calculated as above. The difference ($\Delta VS=VAABG-VSTUS$) between the two values represents the volume flow to be diverted via the waste gate. After correction by the boost pressure regulator in 106, this value is converted to an actuating signal for the actuator of the exhaust gas turbocharger, in particular for the actuator of the bypass valve.

For activation of the electrical auxiliary supercharger an inverter 200 is provided which leads to a switching element 202, which preferably exhibits hysteresis. If the inverted volume flow $\Delta VS$ exceeds the specified limit, an operating condition signal B_SCEB is generated. If the volume flow falls below an additional threshold, this conditional signal is reset. The threshold is selected so that resetting is performed when the instantaneous exhaust gas volume flow reaches the setpoint volume flow, or has exceeded it by an amount that is greater than a specified quantity. The auxiliary supercharger is thus switched on when the exhaust gas volume flow is less than the setpoint volume flow. In addition, in one preferred exemplary embodiment a logical AND link 204 is provided in which the conditional signal as described above is compared to an additional conditional signal B_LDR. This is set when boost pressure regulation is requested, i.e., when the setpoint boost pressure exceeds the base boost pressure. If both signals are present, a conditional signal B_SCE is output which results in activation of the electrical auxiliary charger. This auxiliary supercharger is then actuated either by a fixed specified actuating signal or, if required, according to the actual boost pressure, air flow, and/or rotational speed of the engine, etc.

One preferred exemplary embodiment is illustrated in which the calculations are made based on the volume flow rates. In another embodiment, mass flow rates (exhaust gas mass flow) are used instead of volume flow rates.

What is claimed is:

1. A method for operating at least one supercharger of an internal combustion engine having a boost pressure regulator, an output signal of the boost pressure regulator generating an actuating signal for controlling an actuating element of the at least one supercharger, the method comprising:
   providing a pilot control of the actuating element, wherein the pilot control is determined as a function of one of an exhaust gas volume flow and an exhaust gas mass flow, and wherein the pilot control is corrected by the boost pressure regulator,
   wherein the actuating element controls a cross section of an opening of a bypass duct around the turbine of an exhaust gas turbocharger, and wherein the pilot control is configured to operate in such a way that the cross section of the opening of the bypass duct increases when one of the exhaust gas volume flow and the exhaust gas mass flow increases.

2. A method for operating at least one supercharger of an internal combustion engine having a turbine in an exhaust tract of the internal combustion engine and at least one compressor in an induction tract of the internal combustion engine, comprising:
   providing an actuatable actuating element;
   generating an actuating signal for the actuating element;
   determining at least one of an an exhaust gas volume flow and an exhaust gas mass flow;
   wherein the actuating signal is determined as a function of a variable that represents one of the exhaust gas volume flow and the exhaust gas mass flow;
   specifying a setpoint value for one of the exhaust gas volume flow and the exhaust gas mass flow;
   calculating a deviation between the setpoint value and an actual value for one of the exhaust gas volume flow and the exhaust gas mass flow; and
   determining the actuating signal based on the deviation.

3. A method for operating at least one supercharger of an internal combustion engine having a boost pressure regulator, an output signal of the boost pressure regulator generating an actuating signal for controlling an actuating element for an exhaust gas turbocharger, the method comprising:
   providing a pilot control of the actuating element, the pilot control signal being determined as a function of one of an exhaust gas volume flow and an exhaust gas mass flow such that a counter-coupling response of the supercharger is simulated, wherein the pilot control includes:
      specifying a setpoint value for one of the exhaust gas volume flow and the exhaust gas mass flow;
      calculating a difference between the setpoint value and an actual value for one of the exhaust gas volume flow and the exhaust gas mass flow, the difference yielding a deviation signal; and
      determining the actuating signal based on the deviation signal.

4. The method as recited in claim 3, wherein the setpoint value is specified as one of a fixed value and a function of an engine rotational speed and a setpoint boost pressure.

5. The method as recited in claim 4, further comprising:
   providing a boost pressure regulator that generates an output signal as a function of the setpoint boost pressure and an actual boost pressure.

6. The method as recited in claim 5, further comprising:
   generating a pilot control signal as a function of one of the exhaust gas volume flow and the exhaust gas mass flow, wherein: an output signal from the boost pressure regulator corrects the pilot control signal.

7. A method for operating at least one supercharger of an internal combustion engine having a turbine in an exhaust tract of the internal combustion engine and at least one compressor in an induction tract of the internal combustion engine, comprising:
   providing an actuatable actuating element;
   generating an actuating signal for the actuating element; and
   generating an activating signal for an auxiliary compressor as a function of one of an exhaust gas volume flow and an exhaust gas mass flow;
   wherein the actuating signal is a function of a variable that represents one of the exhaust gas volume flow and the exhaust gas mass flow.

8. The method as recited in claim 7, further comprising:
   activating the auxiliary compressor when an exhaust gas volume flow is less than a setpoint volume flow.

9. The method as recited in claim 7, further comprising:
   activating the auxiliary compressor when a setpoint boost pressure is greater than a base boost pressure.

10. The method as recited in claim 7, further comprising:
    switching off the auxiliary compressor when one of:
    the one of the exhaust gas volume flow and the exhaust gas mass flow one of reaches a setpoint value and exceeds the setpoint value by a predetermined value, and a setpoint boost pressure is less than a base boost pressure.

11. A device for operating at least one supercharger of an internal combustion engine, comprising:
    an electronic control unit that includes a boost pressure regulator, an output signal of the boost pressure regulator generating an actuating signal for controlling an actuating element of the at least one supercharger, wherein the electronic control unit includes a pilot control that determines the actuating signal as a function of one of an exhaust gas volume flow and an exhaust gas mass flow such that a counter-coupling response of the supercharger is simulated, and wherein the pilot control is corrected by the boost pressure regulator; and
    wherein means are provided for:
      specifying a setpoint value for one of the exhaust gas volume flow and the exhaust gas mass flow;
      calculating a difference between the setpoint value and an actual value for one of the exhaust gas volume flow and the exhaust gas mass flow, the difference yielding a deviation signal; and
      determining the actuating signal based on the deviation signal.

12. A device for operating at least one supercharger of an internal combustion engine, comprising:
    an electrical control unit configured to generate at least one actuating signal for controlling at least one actuating element of the supercharger, wherein the control unit determines the actuating signal as a function of a variable representing one of an exhaust gas volume flow and an exhaust gas mass flow;
    wherein, for the determination of actuating signal, the control unit:
      specifies a setpoint value for one of the exhaust gas volume flow and the exhaust gas mass flow;
      calculates a deviation between the setpoint value and an actual value for one of the exhaust gas volume flow and the exhaust gas mass flow; and
      determines the actuating signal based on the deviation.

* * * * *